Patented Mar. 20, 1923.

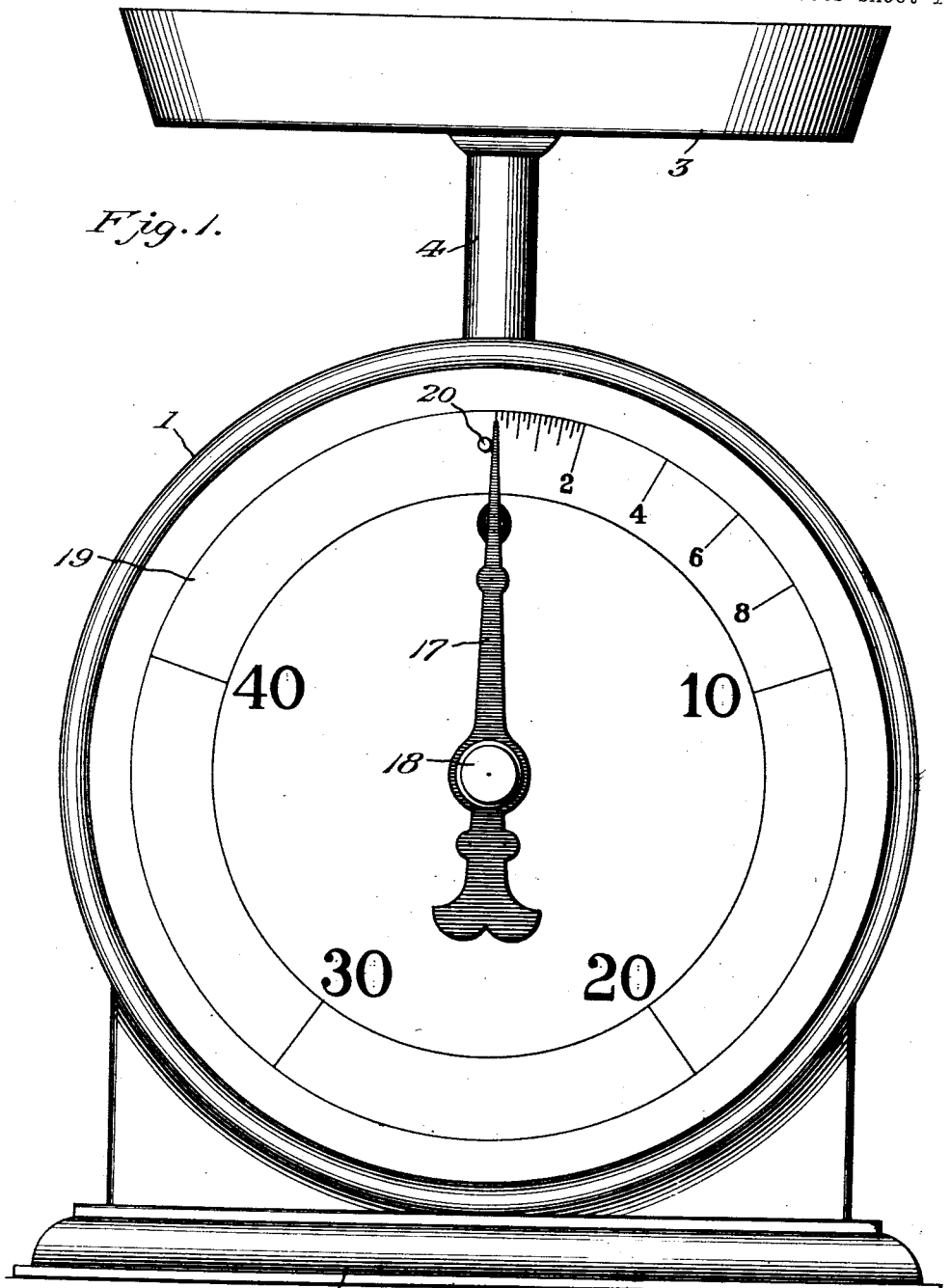

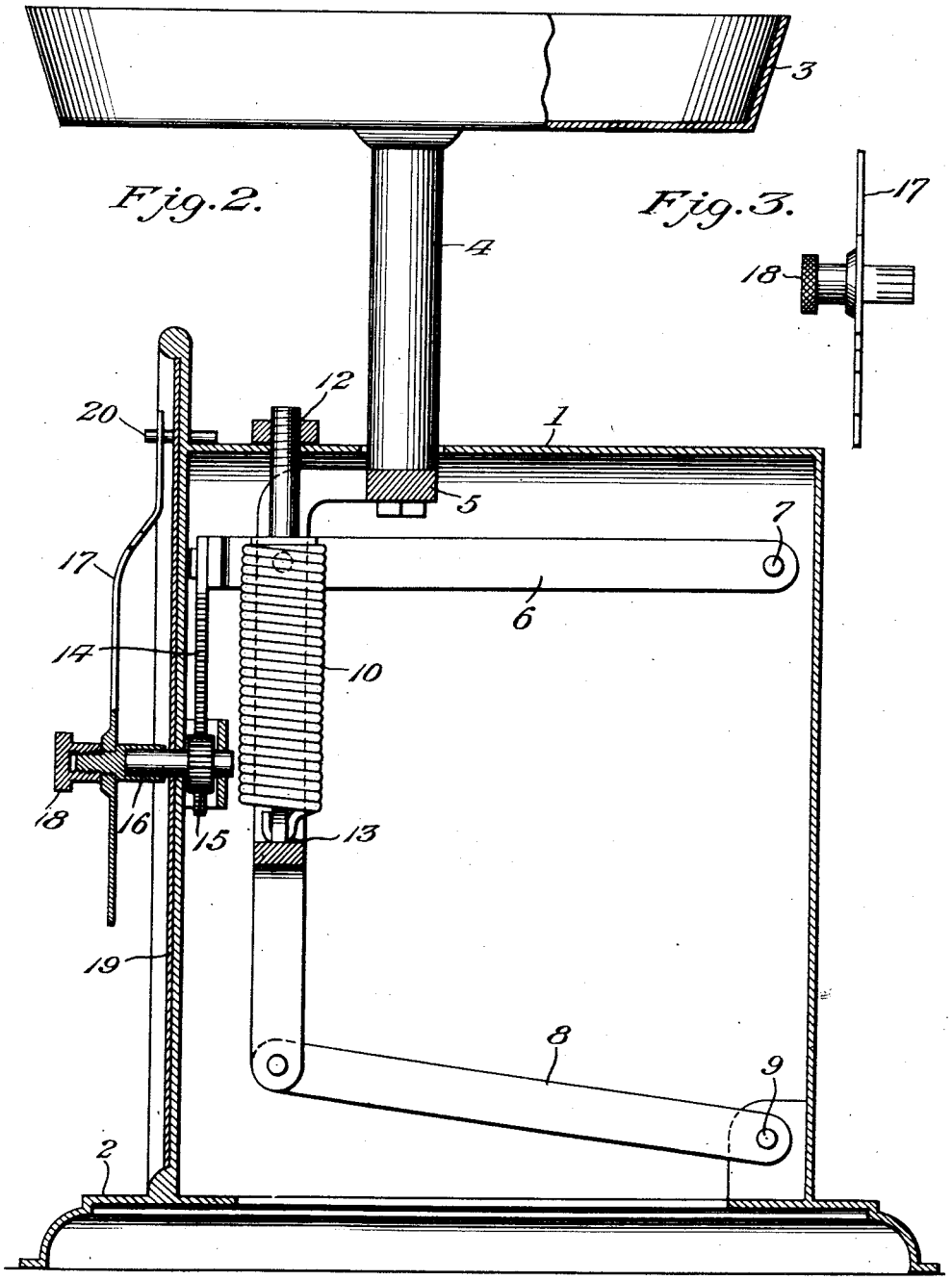

1,449,254

UNITED STATES PATENT OFFICE.

GEORGE W. ZUCKER, OF ATLANTIC TOWNSHIP, MONMOUTH COUNTY, NEW JERSEY.

WEIGHING SCALE.

Application filed November 23, 1921. Serial No. 517,257.

*To all whom it may concern:*

Be it known that I, GEORGE W. ZUCKER, a citizen of the United States, residing at Atlantic Township, in the county of Monmouth and State of New Jersey, have invented certain new and useful Improvements in Weighing Scales, of which the following is a specification.

This invention relates to weighing scales, and more particularly to that type where from an unknown gross weight one is able to determine or obtain a desired net weight.

The object is to determine the weight of any part of a volume without knowing the gross weight of the volume.

A further object is to determine the weight of any number of parts of the volume, or weights of any number of articles it contains, regardless of the weight of the volume.

In the accompanying drawings:

Fig. 1 is a front elevation of a scale embodying my invention;

Fig. 2 is a side elevation thereof, partly in section;

Fig. 3 is an enlarged detail view of the removable indicating-hand.

The numeral 1 indicates the casing of the scale, adapted to enclose the weighing mechanism, which is supported upon a suitable base, 2. It is understood any form of weighing mechanism may be used, the invention being of such a nature that it can be applied to any form of weighing-scale by a slight modification; and the weighing mechanism herein shown is illustrated merely for the purpose of showing one application of the invention upon a well-known scale.

The numeral 3 indicates a pan mounted upon a suitable support 4, the latter being secured to a frame 5. The upper end of the frame is pivotally connected to a horizontally arranged beam 6 pivoted at its opposite end as at 7 to the casing 1. Connected to the lower end of the frame 5 is a similar beam 8, which lies parallel with the beam 6, and is likewise pivoted at its opposite end, as at 9, to the casing 1.

A vertically-arranged spring 10 is adjustably secured at its upper end, as at 12, to the casing 1, and the lower end thereof is secured as at 13 to the frame 5. A rack 14 is carried by the frame 5, said rack in turn meshing with a pinion 15 carried by the stub-shaft 16. The rack and pinion are so arranged as to effect a counter clockwise movement to the stub-shaft 16 as the material is placed in the pan. An indicating hand 17 is removably secured to the shaft 16, said hand being provided with a knob 18, whereby it may be adjusted for a purpose hereinafter described.

An indicating dial 19 is arranged upon the face of the casing 1. At the zero-point of the dial, a pin 20 is arranged, said pin facilitating the re-setting of the hand 17, as desired. It is obvious that the pin 20 may be dispensed with, it being used merely as a matter of convenience.

In operation, where it is desirable, for instance, to measure out uneven quantities of feed for live-stock, assuming the invention is built on a much larger scale, the pan 3 is filled with the feed, the amount therein being immaterial. As the pan is filled, the indicating-hand will move in a counter clockwise direction until it is stopped by the pin 20. The frictional engagement with the stub-shaft 16 permits the shaft to revolve, however, as the pan is loaded. Thereafter, as enough feed is scooped out for one feeding, say two pounds, the indicating-hand 17 will move in a clockwise direction until the desired amount is removed. At this point, the hand is again re-set to zero, and the operator proceeds to remove the required amount for the second feed, say three pounds, the operation being repeated, as often as desired, or until the contents of the pan is used.

By this method of dispensing, a great deal of time and labor is saved, the operator is not concerned as to the total weight of the material, nor is there any necessity of keeping track of the different amounts taken from the volume at the different feedings, it being merely necessary to reset the indicating-hand at zero after each feeding.

A further illustration of the convenience and simplicity of the invention is shown in adapting it to the handling of baggage. In this case, where a truck is used, the truck, together with its load, is rolled upon the scales, the weight of the truck or the men on the truck being immaterial. Then as each article is removed from the truck, the weight of that particular article is indicated by the indicating-hand, and likewise the weight of each and every article removed therewith may be readily determined by resetting the indicating-hand for the removal of each article.

It is apparent that more or less slight changes might be made in the construction shown without departing from the spirit of the invention.

I claim:

1. A weighing mechanism, arranged to weigh material as it is removed therefrom, instead of as it is applied thereto, which mechanism includes a receiver upon which the article to be weighed is placed, gear mechanism actuated thereby and including a shaft driven in one direction when the article is placed on the receiver, a dial graduated in a reverse direction to that of the said rotation of the shaft, and a hand frictionally actuated by said shaft to move in the direction indicated by the progressive numbering on the dial when material is removed from the receiver.

2. A weighing mechanism, arranged to weigh material as it is removed therefrom, instead of as it is applied thereto, which mechanism includes a receiver upon which the article to be weighed is placed, a rack and pinion actuated thereby, a shaft carrying the pinion, said shaft driven in one direction when the article is placed on the receiver, a dial graduated in a reverse direction to that of the said rotation of the shaft, and a resettable hand frictionally actuated by said shaft to move in the direction indicated by the progressive numbering on the dial when the material is removed from the receiver.

3. A weighing mechanism having a rotary member which turns in one direction due to the weight of the material placed on the mechanism, a dial graduated in a reverse direction to that of said rotation of the rotary member, and a device frictionally mounted and resettable on the rotary member to starting-point, and thence turned, due to the diminished weight on the mechanism, to indicate on a dial the exact weight of the amount removed.

4. A weighing mechanism comprising a shaft actuated to turn in a counter clockwise direction upon the application of the material to be weighed, an adjustable indicating-hand frictionally secured to the shaft, a dial cooperating with said indicating hand and graduated increasingly in a clockwise direction from zero, and means for stopping the rotation of said indicating-hand in a counter clockwise direction at a predetermined point, said indicating-hand adapted to turn in a clockwise direction as a portion of the material is removed, thereby indicating the exact amount removed.

5. A weighing mechanism comprising a receiver, a vertically movable support therefor, a shaft provided with a pinion adapted to mesh with a rack carried by the vertically movable support, and an indicating-hand adjustably secured to the shaft, said indicating-hand adapted to turn in a counterclockwise direction upon the application of the material to be weighed, said indicating-hand adapted to be turned in a clockwise or the opposite direction as a portion of the material is removed from the receiver, thereby indicating the exact amount removed.

In testimony whereof I affix my signature.

GEORGE W. ZUCKER.